United States Patent

Sabet

[11] 3,840,238
[45] Oct. 8, 1974

[54] SEALING RING

[76] Inventor: Huschang Sabet, Eduard-Pfeiffer-Str., Stuttgart, Germany

[22] Filed: Mar. 13, 1973

[21] Appl. No.: 340,691

[30] Foreign Application Priority Data
Mar. 20, 1972 Germany............................ 2213343

[52] U.S. Cl................. 277/199, 277/136, 277/215, 418/143
[51] Int. Cl............................................ F16j 15/54
[58] Field of Search ............ 418/143; 277/192, 193, 277/194, 195, 196, 197, 198, 199, 216, 217, 134, 214, 215, 207, 24, 136, 218

[56] References Cited
UNITED STATES PATENTS
2,674,234   4/1954   Riggle................................ 418/143
FOREIGN PATENTS OR APPLICATIONS
1,064,856   5/1954   France................................ 277/215
170,121     9/1956   Sweden.............................. 277/193

*Primary Examiner*—Harry N. Haroian
*Assistant Examiner*—John W. Shepperd
*Attorney, Agent, or Firm*—Hans Berman

[57] ABSTRACT

A cylindrical, outer face of the rotor in a rotary-piston internal-combustion engine is sealed to the inner cylindrical face of the engine casing by a sealing ring consisting of circumferentially consecutive, elongated, identical segments. Ribs on the segments jointly constitute a ridge which extends in a substantially continuous loop about the axis of rotation and engages the inner casing face. The ridge repeatedly intersects the axially median plane of the sealing ring so that radial recesses in the ring circumferentially alternate with portions of the ridge, thereby providing access for lubricant to the interface of the ridge and the casing.

8 Claims, 7 Drawing Figures

SEALING RING

This invention relates to sealing rings, and particularly to a sealing ring suitable for sealing a cylindrical surface of the rotor in a rotary-piston, internal-combustion engine to the cylindrical inner face of the engine casing.

The invention will be described with particular reference to a rotary-piston engine of the type disclosed in the copending application Ser. No. 137,870, now U.S. Pat. No. 3,736,080, or in U.S. Pat. No. 3,439,549, but is capable of broader application.

An engine of the afore-mentioned type requires an annular seal between respective cylindrical surfaces of the rotor and of the engine casing for preventing axial escape of hot combustion gases under high pressure from a chamber bounded by rotary pistons of the engine. Because of the thermal, mechanical, and chemical stresses under which the seal operates, it is necessary for a long service life that it be lubricated. Lubrication is readily provided for the analogous piston rings of a reciprocating engine which axially sweep the cylinder wall. This is more difficult for an annular seal in a rotary piston engine whose axial position remains constant.

Even when adequately lubricated, seals made from materials presently available on a commercial scale have a limited useful life, and it is important that they be capable of quick and convenient replacement.

It is an object of this invention to provide a sealing ring suitable for use in a rotary piston engine and under similar conditions, which gives access to the interface between the sealing ring and a machine element swept by the ring during machine operation, and which is readily replaced when necessary.

With this object and others in view, as will presently become apparent, the sealing ring of the invention is constituted by a plurality of substantially identical, circumferentially elongated, separate segments which may be moved relative to each other for easy installation and removal. The ring has an axially median plane perpendicular to the ring axis. The segments carry respective radially projecting ribs which constitute a ridge elongated in a cylindrical surface about the ring axis in a substantially continuous loop. The ring repeatedly intersects the afore- mentioned median plane, the number of intersections being equal to the number of segments times an integer. Each rib has two longitudinal end portions, of which each is circumferentially coextensive with a corresponding end portion of a circumferentially adjacent segment.

Other features and many of the attendent advantages of this invention will readily become apparent from the following detailed description of preferred embodiments when considered in connection with the appended drawing in which.

Figure 2:
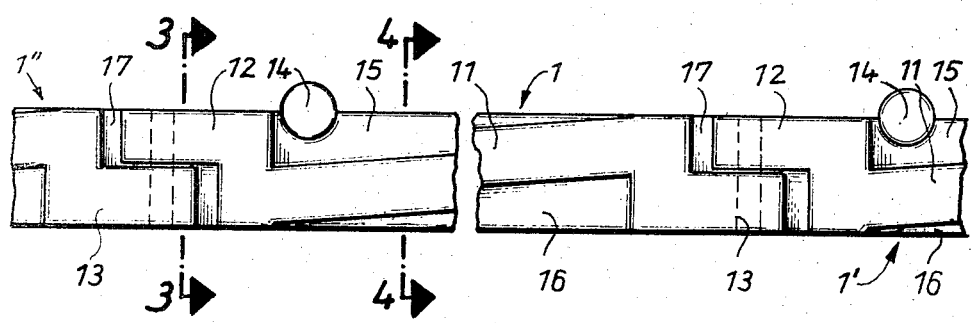
FIG. 2 shows the sealing ring in the apparatus of FIG. 1 in a greatly enlarged, fragmentary, developed view.
Figure 3:
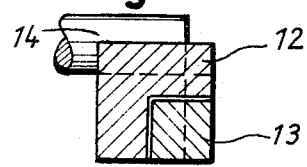
Figure 4:
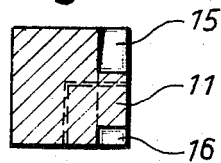
Figure 5:
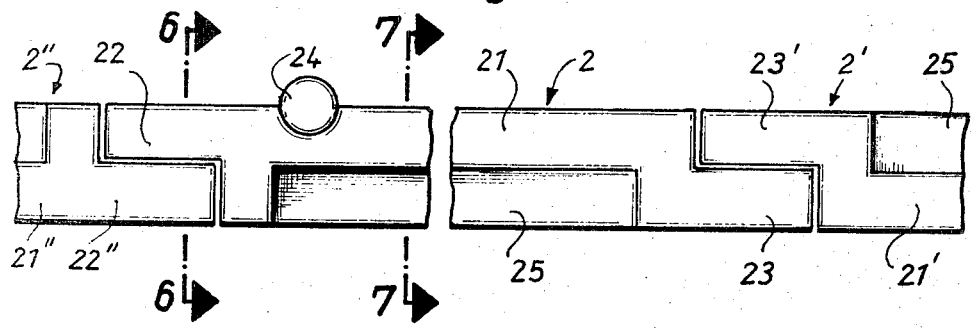
Figure 6:
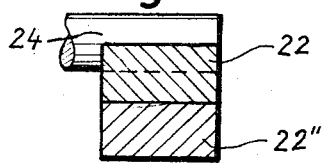
Figure 7:
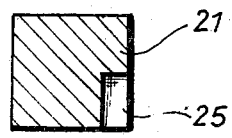

FIGS. 3 and 4 respectively show the device of FIG. 2 in section on the lines 3—3 and 4—4;

FIG. 5 illustrates a modification of the device of FIG. 2 in a corresponding view; and FIG. 6 and 7 respectively show the device of FIG. 5 in section on the lines 6—6 and 7—7.

Figure 1:
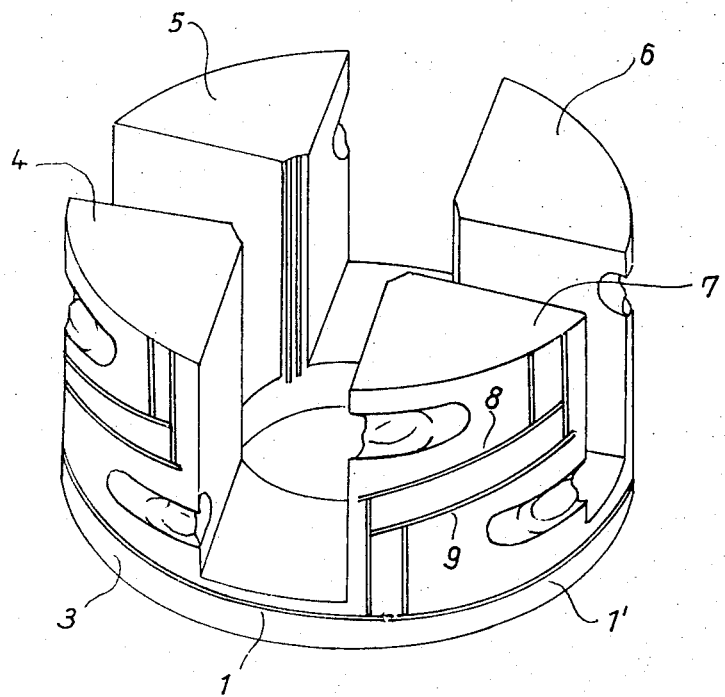
FIG. 1 shows a rotor portion of the rotary-piston engine disclosed in said copending application, the rotor portion being equipped with a sealing ring of the invention and illustrated in a perspective view.

Referring now to the drawing in detail, and initially to FIG. 1, there is seen one of the two rotor elements employed in the internal-combustion engine of the earlier application. It mainly consists of a unitary piece of metal providing a flat, centrally apertured, cylindrical disc 3 from which four identical pistons 4, 5, 6, 7 project axially in circumferentially spaced relationship. The pressure of an exploding fuel mixture in a chamber bounded circumferentially by one of the pistons 4, 5, 6, 7 and by a piston of the non-illustrated other rotor element causes the one piston to turn the disc 3 about its axis in a non-illustrated engine casing which has a coaxial, inner wall of circular cross section about the disc 3. To avoid premature escape of the combustion gases generated by the exploding fuel mixture, the rotor element must be sealed to the cylinder wall.

A sealing ring having segments 1, 1' visible in FIG. 1 seals the cylindrical circumference of the disc 3 to the cylinder wall, and other sealing elements 8,9 similarly seal each of the pistons 4,5,6,7. This invention is particularly concerned with the sealing ring on the disc 3 whose segments are partly recessed in a circumferential groove of the disc, as is conventional and not shown in detail.

As is partly shown in FIG. 2, the sealing ring consists of three identical segments 1, 1', 1" which jointly extend over the entire circumference of the disc 3 and are partly recessed in the groove of the latter. Each segment is a unitary piece of heat-resistant, somewhat flexible composition not itself relevant to this invention. Its inner face, as is partly seen in FIGS. 3 and 4 is cylindrical and of uniform axial height.

Radial recesses 15,16,17, in the outer face leave a continuous land or rib having portions 11,12,13. The central rib portion 11 is elongated obliquely relative to the axially median plane of the sealing ring, and intersects the median plane at a small, acute angle. The circumferentially terminal rib portions 12,13 are each approximately L-shaped. The shorter leg of each L-shape is integral with an associated end of the central rib portion 11 and is axially elongated. The longer leg of each L-shape 12,13 is circumferentially elongated and circumferentially bounds one of the recesses 15,16 which are open in a radially outward direction and in respective axial directions. Each recess 17 is bounded by the two legs of a terminal rib portion 12,13 and receives a terminal rib portion of a circumferentially adjacent segment.

The respective terminal rib portions 12,13 of two circumferentially adjacent segments are thus axially juxtaposed in circumferentially coextensive or overlapping relationship. As is best seen in FIG. 3, the terminal portion of the segment 1 and the longer leg of the rib portion 13 on the segment 1" jointly define a rectangle in axial section. The terminal portion of the segment 1 is bounded by each of the four sides of the rectangle, while the rib 13 is bounded by portions of two sides, one of which represents the outer face of the sealing ring seen in FIG. 1.

The central rib portions 11 and the terminal rib portions 12,13 of the segments 1,1',1" jointly constitute a ridge which extends about the ring axis in a common cylindrical surface for engagement with the non-illustrated, inner, cylindrical face of the engine casing. The ridge forms a practically continuous loop which intersects the median plane of the ring in the center of each central rib section 11, and in each shorter leg of a terminal rib portion 12,13, thus intersecting the median plane three times in each segment, and altogether nine times. The recesses 15,16,17 circumferentially alternate with portions of the ridge 11,12,13. During relative rotation of the rotor element illustrated in FIG. 1 and the non-illustrated engine casing, the recesses 15,16,17 permit lubricant to reach the interface of the composite ridge 11,12,13 and of the inner engine casing wall.

The several segments 1, 1',1" may be held in the annular groove of the disc 3 by being resiliently compressed between the radial groove walls, but the non-illustrated engine casing prevents their escape from the groove in a radially outward direction. Circumferential movement of the sealing ring in the groove of the disc 3 is adequately prevented by short cylindrical pins 14 which project from the disc 3 into respective, conforming, semi-cylindrical notches in the segments 1,1',1". The notches are open in an axial and a radially inward direction, that is, away from the rib of the segment, but may also pass through the entire segment, as is shown in FIG. 2.

The several segments 1, 1', 1" are sufficiently secured to the disc 3 to permit the sealing ring to be installed on the disc prior to assembly of the latter with the engine casing, yet, they may be removed readily with the simplest of tools because they are capable of relative movement from the operative position shown in the drawing. No tools are needed for installing new ring segments. Installation is further facilitated by the fact that the several segments 1,1',1" are identical in shape and size. The relationship between the circumferential length of the central rib portion 11 and the combined circumferential length of the terminal rib portions 12,13 on each ring segment may be chosen to fit specific conditions. However, it is generally most advantageous to have the minimum number of ring segments consistent with convenient installation and removal, and to make the terminal rib portions 12,13 quite short for good lubricant access through the recesses 15,16 which are circumferentially coextensive with the central rib portion 11. Thus, it is best practice to make the circumferential length of the rib portion 11 at least one half the circumferential length of the entire segment.

In the modified sealing ring segments 2,2',2" illustrated in FIGS. 5 to 7, the central rib portions 21,21',21" are elongated circumferentially in a radial plane on one side of the axially median plane of the ring, and the corresponding central rib portions of the two adjacent ring segments are located on the opposite side of the median plane. The modified ring illustrated in FIG. 5 thus must have an even number of identical segments, preferably two or at most four. The terminal rib portions 22,22",23,23' are L-shaped as described with reference to the corresponding elements 12,13 in FIGS. 2 to 4, and radially extend over the full thickness of the ring. A very narrow, S-shaped gap is thus formed between the terminal rib portions of circumferentially adjacent segments, but is sealed practically heremetically by the pressure differential between the two spaces axially separated by the sealing ring, the width of the gap being exaggerated in FIG. 5 for the sake of convenient pictorial representation, and more realistically represented in the sectional view of FIG. 6.

Round pins 24 project from the disc 3 into respective hemicylindrical notches of the ring segments for circumferentially securing each ring segment in the groove of the disc 3. However, one pin 24 engaging only one segment may often be adequate. A long, straight groove 25 of one ring segment 2, coextensive with the central rib portion 21, alternates circumferentially with the long leg of the associated L-shaped rib portion 23, the short leg of the associated L-shaped rib portion 22, the long leg of the rib portion 22" on a circumferentially associated segment, and the central rib portion 21" of the latter on the same side of the axially median ring plane, thereby permitting adequate lubrication of the interface between the composite ridge of ribs on the ring of FIGS. 5 – 7 and the associated engine casing.

To serve their purpose, the recesses 15,16,25 need only be relatively shallow. The recesses 17 shown in FIG. 2 have a depth equal to one half the maximum radial thickness of the ring shown in FIGS. 2 to 4, and the corresponding recesses in the ring of FIGS. 5 to 7 extend through the entire thickness of the sealing ring. Obviously, the L-shaped rib portions 12,13 may be interchanged with the rib portions 22,23 for producing modified end seals between the ring segments of the two illustrated embodiments.

Other changes and modifications will readily suggest themselves to those skilled in the art, and it will be understood that, within the scope and spirit of the appended claims, this invention may be practiced otherwise than as specifically disclosed.

What is claimed is:

1. A sealing ring having an axis and being constituted by a plurality of substantially identical, circumferentially elongated, separate segments movable relative to each other, said ring having an axially median plane, said segments including respective radially projecting ribs, said ribs jointly constituting a ridge elongated in a cylindrical surface about said axis in a substantially continuous loop and repeatedly intersecting said median plane, the number of intersections of said ridge and of said plane being an integral multiple of the number of said segments, each rib having two longitudinal end portions, each end portion being circumferentially coextensive with a corresponding end portion of a circumferentially adjacent segment.

2. A ring as set forth in claim 1, wherein each of said ribs has a central portion intermediate said end portions, said central portion obliquely intersecting said plane.

3. A sealing ring as set forth in claim 1, wherein said central portion is offset from said median plane in one axial direction, and the central portion of the rib on a circumferentially consecutive segment is offset from said plane in an axial direction opposite to said one axial direction.

4. A sealing ring as set forth in claim 1, wherein the rib of each segment has a central portion, each end portion being approximately L-shaped and including an axially elongated leg part and a circumferentially elongated leg part, said central portion integrally connecting the axially elongated leg parts of said two end portions and bounding an axially and radially open recess in said segment.

5. A sealing ring as set forth in claim 4, wherein said axially elongated leg parts intersect said plane.

6. A sealing ring as set forth in claim 5, wherein said central portion is elongated and obliquely inclined relative to the respective directions of elongation of said leg parts.

7. A sealing ring as set forth in claim 4, wherein the length of each axially elongated leg part is greater than the axial dimension of the central portion integrally connected to said leg part.

8. A sealing ring as set forth in claim 1, wherein the rib of each segment intersects said plane more than once.

* * * * *